United States Patent
Kovacs, II et al.

(10) Patent No.: US 6,185,995 B1
(45) Date of Patent: Feb. 13, 2001

(54) METHOD AND SYSTEM FOR DETERMINING PROPER ASSEMBLY OF ENGINE COMPONENTS

(75) Inventors: Stephen F. Kovacs, II, New Hudson; Robert J. Rucha, Shelby Township, both of MI (US)

(73) Assignee: ABB Flexible Automation Inc., New Berlin, WI (US)

( * ) Notice: Under 35 U.S.C. 154(b), the term of this patent shall be extended for 0 days.

(21) Appl. No.: 09/348,154

(22) Filed: Jul. 6, 1999

(51) Int. Cl.$^7$ .................................................. G01M 15/00

(52) U.S. Cl. ........................................................... 73/116

(58) Field of Search ................................ 73/116, 117.1, 73/117.2, 117.3, 118.1, 570, 593, 119 R

(56) References Cited

U.S. PATENT DOCUMENTS

| | | | |
|---|---|---|---|
| 4,730,484 | * | 3/1988 | Olschefski ......................... 73/119 R |
| 5,392,642 | * | 2/1995 | Tao ...................................... 73/117.3 |
| 5,421,199 | * | 6/1995 | Himmler ................................. 73/462 |
| 5,511,422 | * | 4/1996 | Hernandez ............................. 73/593 |
| 5,517,858 | * | 5/1996 | Matsuzaki et al. .................... 73/593 |

* cited by examiner

Primary Examiner—Richard A. Moller
(74) Attorney, Agent, or Firm—Harness, Dickey & Pierce, P.L.C.

(57) ABSTRACT

Apparatus and a method for testing for improper assembly of moving parts features the use of a plurality of vibration sensors placed on predetermined locations of an external surface of a device housing the moving parts. A computing element analyses the sensor outputs to determine whether an assembly error exists, the nature of the error and its location within the device.

13 Claims, 3 Drawing Sheets

METHOD AND SYSTEM FOR DETERMINING PROPER ASSEMBLY OF ENGINE COMPONENTS

BACKGROUND OF THE INVENTION

The invention relates to methods and apparatus for testing for the proper assembly of components of apparatus having moving parts. More particularly, the invention pertains to methods and apparatus for determining the proper assembly of automotive engine blocks, including the internal moving parts of such blocks.

While moving down an assembly line, automotive engines may be subject to assembly errors, either by human operators or by automated equipment. Traditionally, two of the most commonly encountered assembly errors for engine components are reversed piston heads and missing connecting rod bearings.

FIG. 1 depicts the cross-section of an engine block 100 showing a crankshaft 106 having a center line of rotation 104 and the connecting rod 108 and its associated piston head 110 for one cylinder 102 of the engine. If piston head 110 is installed incorrectly- that is, upside down, then head 110 will lie at an angle to the longitudinal center line of the cylinder, thereby creating a "slap" condition which is obviously detrimental to proper functioning of the engine once it is fully assembled and started. The slap condition arises from head 110 improperly contacting the cylinder wall at points 111 and 112.

Similarly, if during the assembly process, a bearing between crankshaft 106 and connecting rod 108 is omitted, connecting rod 108 and its associated piston head 110 will not operate as intended. Rather pronounced knocking vibrations will result from the connecting rod having too much "play" during its stroke, due to the absence of the bearing.

In conventional assembly processes, assembly errors such as those discussed above have been discovered either "the hard way" by starting the fully assembled engine and suffering the consequences, by use of complicated and expensive optical inspection systems, or by labor-intensive manual inspection.

Therefore, there is seen to be a need in the art for an automated, yet relatively simple method and apparatus for determining whether proper assembly of a device having moving internal parts, such as an automotive internal combustion engine, has taken place.

SUMMARY OF THE INVENTION

Accordingly, a plurality of vibration sensors are arranged in a predetermined positional pattern in contact with a device under test. The output of each of the sensors is electrically coupled to a computing element. A coupling device couples a source of motive power so as to cause movement of assembled movable parts within the device. While the source is moving the movable parts at a predetermined rate, vibrations in the device under test are converted to electrical signals by the array of sensors and forwarded to the computing element for conversion into digital signatures. The computer utilizes a method to analyze the digital signatures to determine whether the engine has been assembled correctly. If an assembly error is detected by the computing element, the method functions further to identify both the type of assembly error and the location or locations within the device where the assembly error has occurred.

BRIEF DESCRIPTION OF THE DRAWING

The objects and features of the invention will become apparent from a reading of a detailed description, taken in conjunction with the drawing, in which.

DETAILED DESCRIPTION

Figure 1:
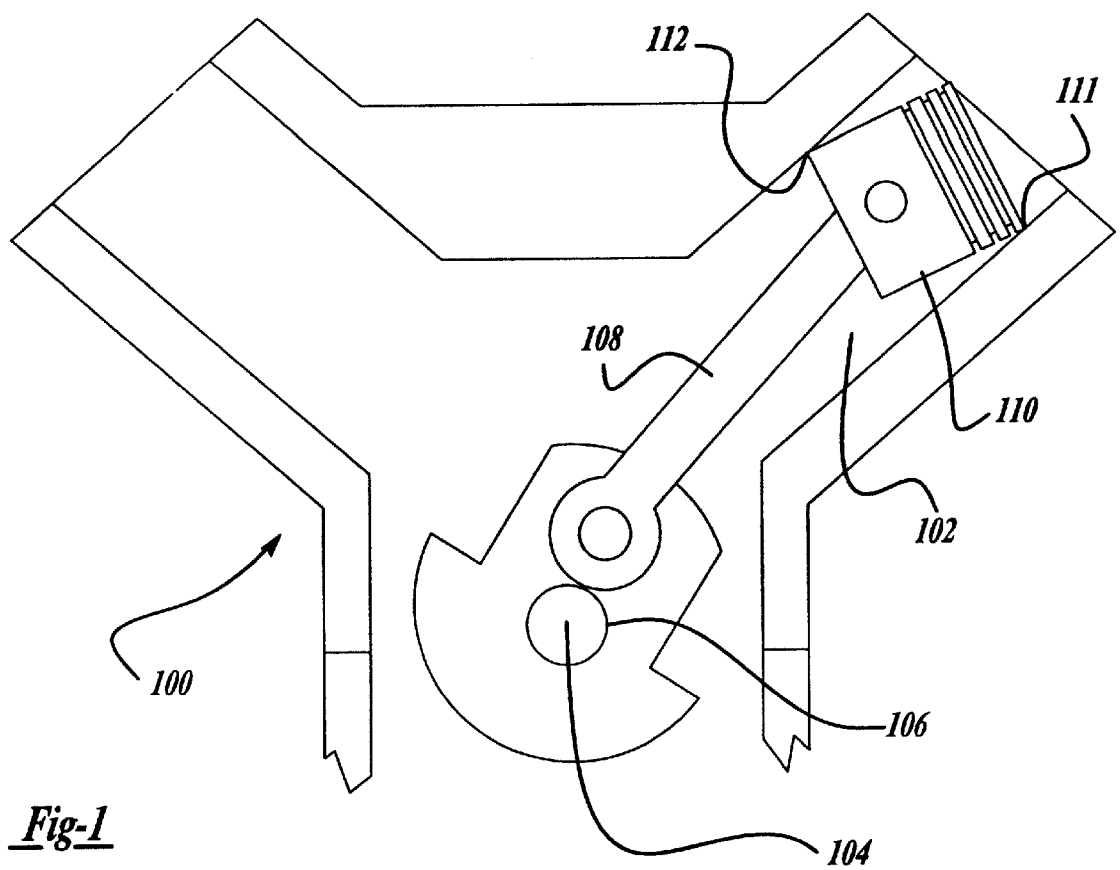
FIG. 1 is a cross sectional view of a portion of an engine block demonstrating incorrect piston installation.
Figure 2:
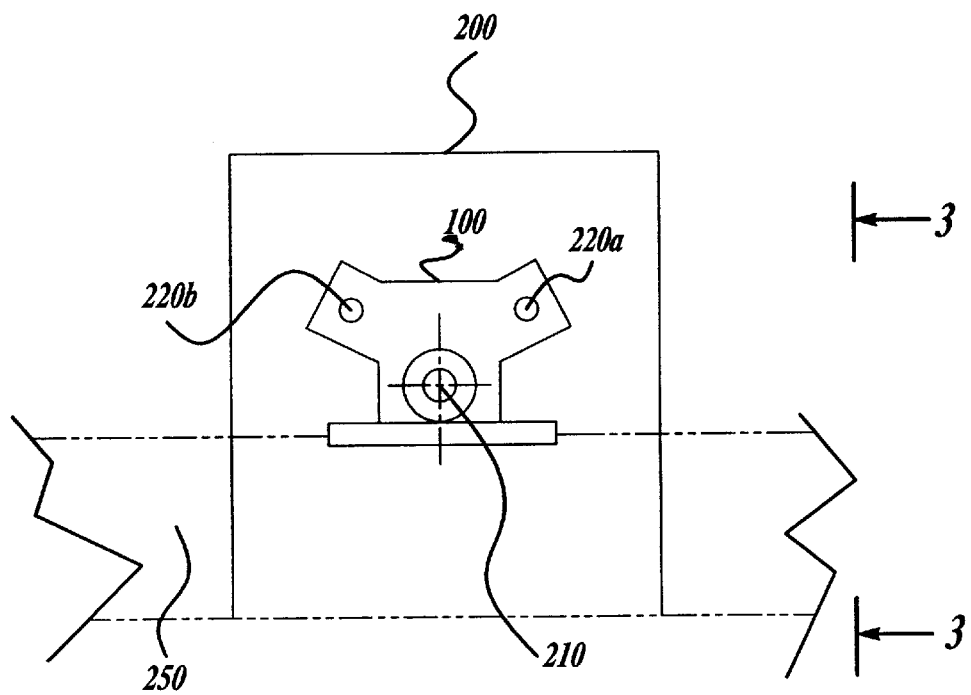
FIG. 2 is a functional block diagram showing an end view of a test station and the engine block to be tested.

As discussed briefly above, FIG. 1 shows a cylinder 102 in which the associated piston head 110 has been inserted upside-down. Under this condition, the incorrect installation results in the piston contacting the cylinder at points 111 and 112, which will create a knocking or slapping condition as the piston head follows its associated connecting rod 108 along its stroke path. Likewise, when a bearing normally lying between the crankshaft 106 and connecting rod 108 is missing, a relatively violent knock condition will exist. We have discovered that the vibrations initiated by either or both of these assembly errors may be utilized in deriving information as to the nature and location of the assembly fault With reference to FIGS. 2 and 3, test station 200 receives at least partially assembled engine blocks 100 transported to the station by a conveyor 250. Upon arrival at station 200, engine 100 is lifted from conveyor 250 by means not shown so as to isolate engine 100 from any noise and vibrations emanating from other positions along the conveyor belt. This action results in an isolation gap 230 between block 100 and conveyor 250. Next, pneumatic cylinders 384a and 384b move mounting plates 186a and 186b, respectively, toward opposite ends of engine block 100 to place four sensors 220a, 220b, 220c and 220d in contact with predetermined locations on the external surfaces of engine block 100. Additionally, mounting plate 186b moves a drive coupling element 382 into engagement with crankshaft 380 (having an axis of rotation at 210 of FIG. 2) of engine 100, thereby coupling shaft 380 to the drive shaft of electric servo motor 370.

Motor 370 is then started and brings crankshaft 380 up to a predetermined rotational speed, for example 120 rpm. At this point, if there are any assembly errors involving the connecting rod bearings or piston heads of motor 100, knock-like vibrations will be detected by each of the sensors 220a, 220b, 220c and 220d. (It will be understood that sensor 220d is not visible in the views of FIGS. 2 and 3.) Assembly irregularities will thus be manifested at the output of the sensors as a series of noise spikes or "clicks". Stored program computer 360 collects the analog outputs from sensors 220a–d via data buses 390a, 390b, 390c and 390d, respectively. Analog to digital converter card 362 associated with computer 360 converts the sensor outputs to digital signal signatures for analysis by computer 360 via the methods of this invention to be described below.

Sensors 220a–d may comprise any mechanical- to -electrical transducer capable of converting mechanical vibrations to electrical signals. In a preferred embodiment, sensors 220a–d comprise accelerometers, such as the model no. 353B65, commercially available from PCB Piezotronics, Inc. of Depew, N.Y. Alternatively, sensors 220a–d could comprise piezoelectric devices or conventional microphones. Other types of equivalent transducers may be selected by those of ordinary skill in the art.

Figure 3:
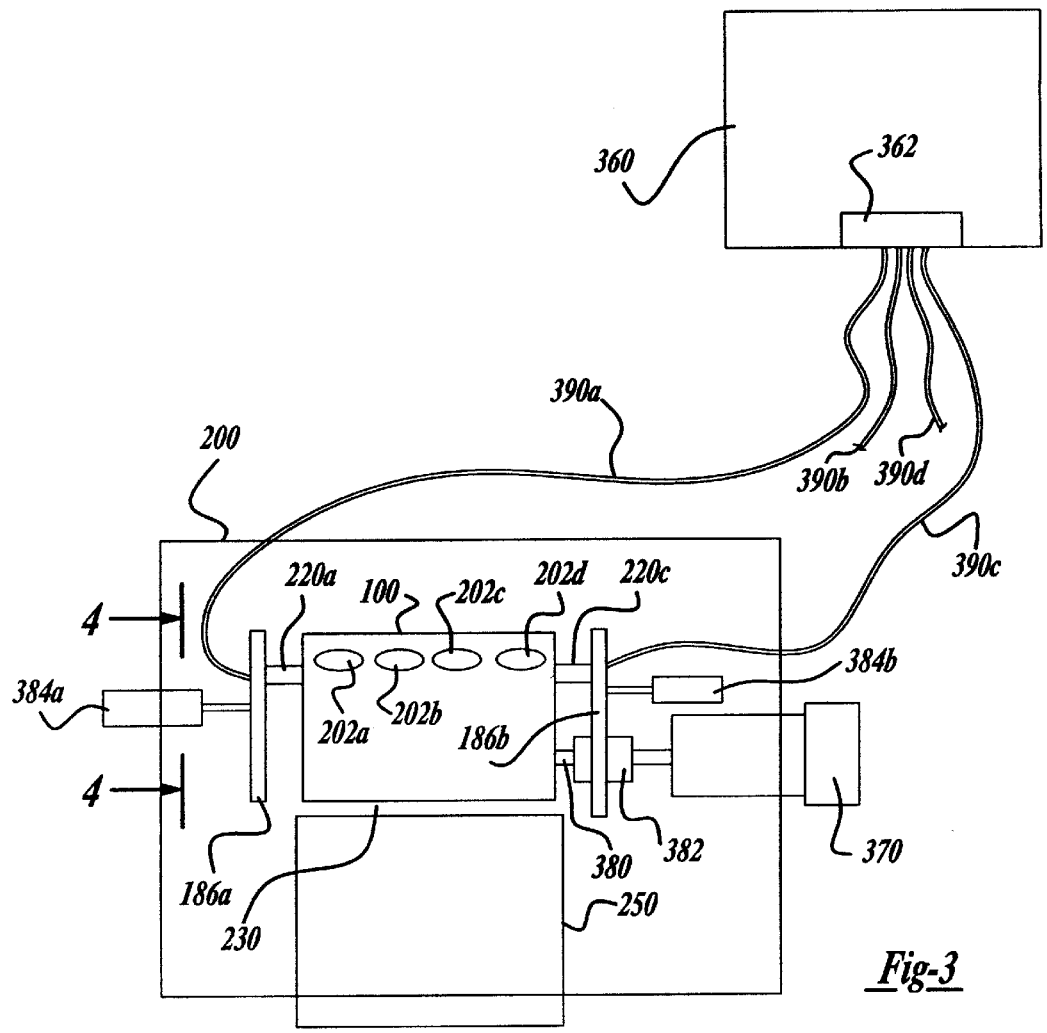
FIG. 3 is a functional block diagram showing a view taken along arrow 3 of FIG. 2 of the test station of FIG. 2.
Figure 4:
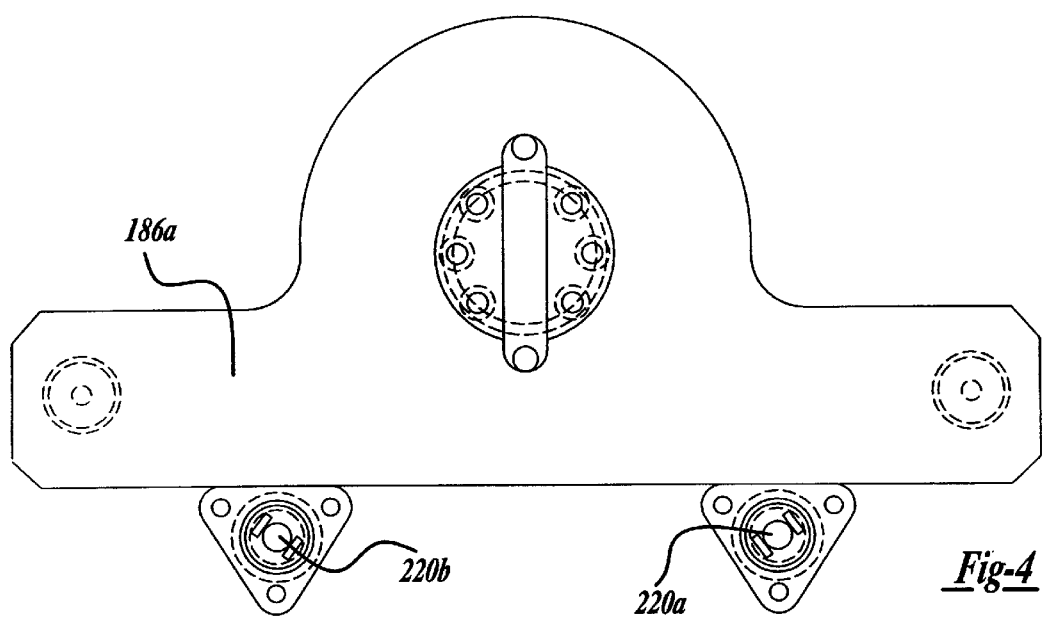
FIG. 4 is a view taken along arrow 4 of FIG. 3 of a mounting plate for two of the sensors used in the test station of FIGS. 2 and 3.

FIG. 4 depicts a front elevational view of mounting plate 186a of FIG. 3. Accelerometer sensors 220a and 220b are shown mounted in the center of triangular plates 402 and 404 attached to plate 186a. It is to be understood, however, that mounting portions for the sensors could be an integral part of mounting plate 186a. Preferably, the sensors are spring loaded in their mounting positions to assure proper physical contact with the engine block upon movement by pneumatic cylinders 384a and 384b of the plates 186a and 186b into engaging position wit h the engine block 100.

Due to the positioning of the accelerometer sensors 220a–d with respect to the engine block 100, the amplitude of the vibrational spikes or clicks will vary from sensor to sensor, depending upon the location(s) of the assembly error(s). This fact is utilized by an analysis method in computer 360 in determining the nature of any assembly error and its location within engine block 100. A preferred location of the sensors is at the ends of the engine block at positions externally adjacent to cooling water channels formed in the interior of the block.

Figure 5:
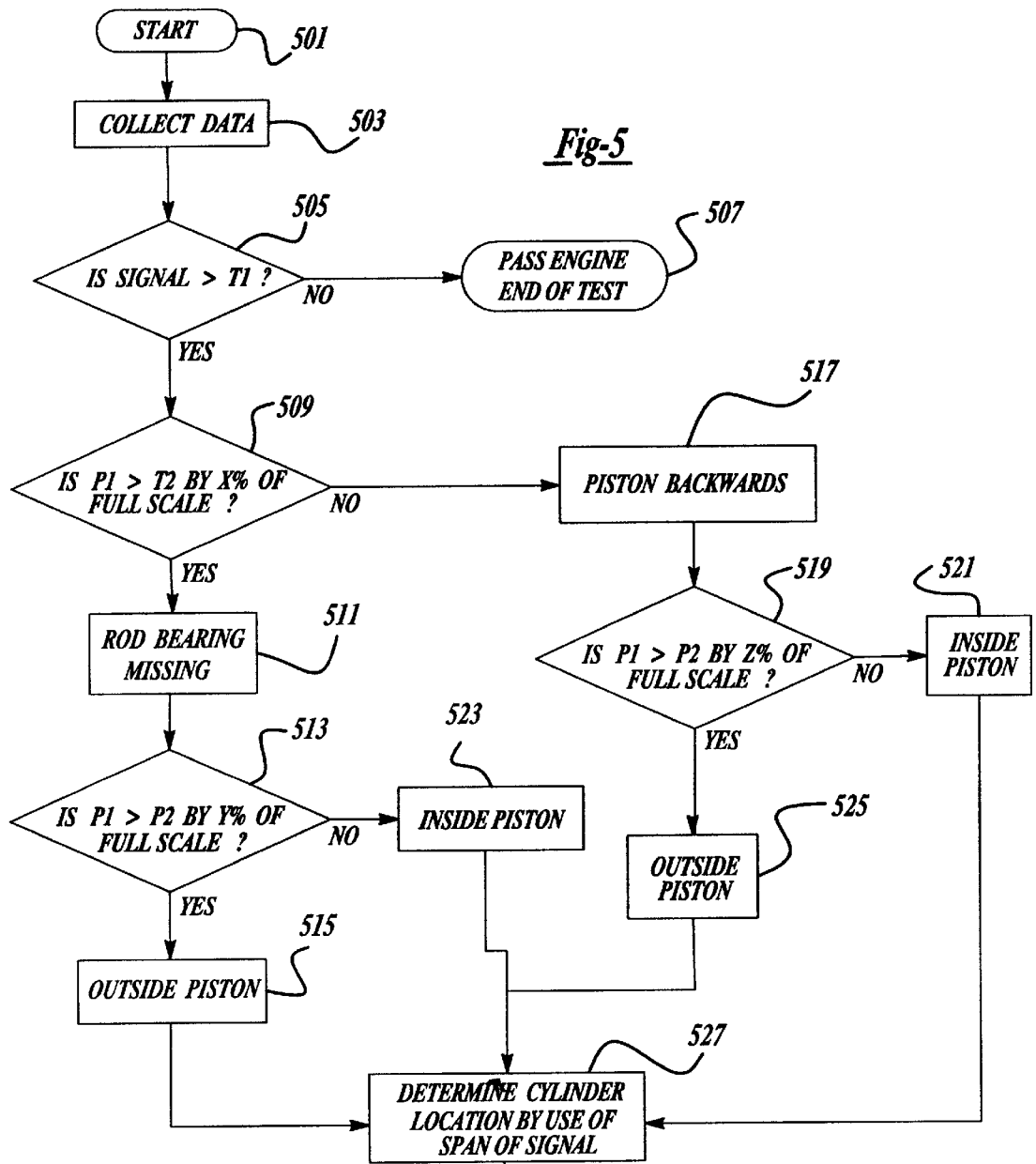
FIG. 5 is a flowchart setting forth the procedure by which the type and location of engine assembly error is determined in accordance with the principles of the invention.

FIG. 5 sets forth a flow chart diagram for a method of determining whether the engine has been assembled properly, and, if not, the nature of the assembly error and its location. With reference to FIG. 5, the routine starts at block 501 and proceeds to block 503 where data from the four vibration sensors 220a–d (FIGS. 2–4) is collected, and the sampled and digitized outputs thereof are placed in four linear arrays of data. A sampling rate of 10,000 samples/second has been found to produce acceptable results.

The data collection at block 503 continues by examining each array for the maximum and minimum digital sample values in each array. The minimum value in each array is subtracted from the maximum value in the same array to obtain a "span" for each sensor output. Hence the span value for each sensor represents the maximum sensor output signal excursion for that sensor.

Next, the array with the greatest signal transition, or span P1, is compared to a predetermined limit value, or threshold T1, at decision block 505. If the maximum span value P1 is greater than the predetermined limit T1, then the routine recognizes that the sensed vibration levels are abnormally high, thereby indicating that an assembly error has occurred. If the maximum span P1 is less than the predetermined amount T1, then the routine passes to block 507, and the test is completed with an indication that the engine has been successfully assembled.

When the predetermined limit has been exceeded, the routine proceeds to decision block 509, where the amount by which the maximum span value exceeds a second predetermined noise value T2 is compared to a predetermined percentage of full-scale. If this excess value is greater than the predetermined percentage of full-scale, then the routine proceeds to block 511 to be described below. If the span value excess is not greater than the predetermined percentage of full-scale, then the rutine proceeds to block 517, where it is determined that a piston has been installed backwards, leading to the above-described piston slap condition.

Once it has been determined that a piston has been improperly installed at block 517, the routine proceeds to decision block 519. At decision block 519, the sensor output having the greatest span P1 is compared to the sensor output having the next greatest span P2. If the difference between these two spans is greater than a predetermined percentage of full-scale, than the routine proceeds to block 525 and indicates that a piston nearest the ends of the engine block, or an "outside" piston is involved. If the greatest and next greatest spans fail the comparison test set forth in decision block 519, then the routine proceeds to block 521, where an indication is generated that a piston furthest away from the four sensors, or an "inside piston" is involved.

Whether an inside or outside piston is involved, the routine then winds up at block 527, where the location of the cylinder is determined using the relative magnitudes or spans of the signals of the vibration sensor having the greatest output and vibrations of the sensor having the next greatest output.

Once the specific cylinder location is determined, as described below, the routine exits at 529 with an indication that the engine has been improperly assembled, and the location of the assembly error.

Returning to decision block 509 of FIG. 5, if the sensor output having the greatest span magnitude is greater than the predetermined noise limit T2 by a predetermined percentage of full-scale, then the routine proceeds to block 511, and indicates that a connecting rod bearing is missing.

From block 511 the routine will then proceed to decision block 513 where the greatest span value P1 is compared to the next greatest span value P2. If this comparison results in a difference greater than a predetermined percentage of fullscale the routine proceeds to block 515 and indicates that an outside piston is involved in the assembly error. If the comparison to the predetermined percentage of full-scale leads to the result that the difference is less than the percentage of full-scale, than the routine proceeds to block 523 where an inside piston is indicated to be the source of the assembly error.

Once the determination of whether an inside or an outside piston is involved has been made, the routine proceeds to block 527, where, again, the specific cylinder involved in the assembly error is determined by analyzing the span, or maximum amplitude excursion of various sensor signals.

Figure 6:
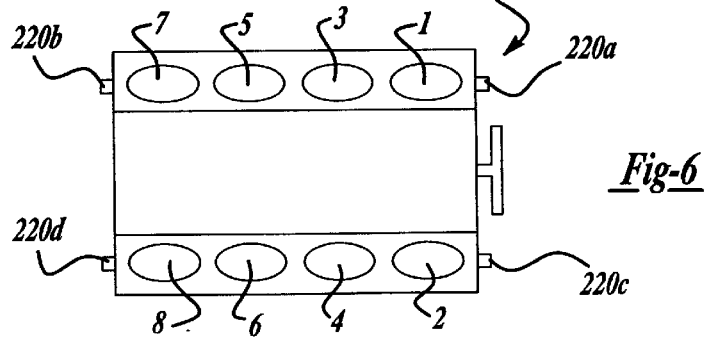
FIG. 6 is a top view of a typical V-8 engine setting forth the numerical designation of the cylinders in relation to four vibration sensors positioned on the engine.

The determination of the location of the assembly fault at block 527 of FIG. 5 is best understood by considering the top view of a typical V-8 engine block 100 of FIG. 6. With reference to FIG. 6, the four vibration sensors 220a–d are shown mounted at opposite ends of engine 100. Cylinders 1, 3, 5 and 7 are located at the left hand of the V, and cylinders 2, 4, 6 and 8 are positioned as shown at the right hand of the V.

Knowing the relative positions of cylinders 1 through 8, the routine set forth in FIG. 5 utilizes the relative maximum amplitude of the signals from sensors 220a–d to determine the location of the assembly fault. "Inside cylinders" are those furthest from either end of engine 100- namely, cylinders 3, 5, 4 and 6. "Outside cylinders" are those nearest to the vibration sensor array at either end of engine 100- namely, cylinders 1, 2, 7 and 8.

The method of block 527 of FIG. 5, knowing the pattern of inside and outside cylinders, utilizes the relative magnitudes, or spans, of the four sensors 220a–d to pinpoint the cylinder or cylinders in which an assembly problem has occurred.

If the sensor with the greatest span value is to 200a and the method of FIG. 5 has determined that an inside cylinder is involved, then the routine identifies the location of the problem as cylinder 3, since cylinder 3 is the closest inside cylinder to sensor 220a. Similarly, if the sensor with the greatest span value is 220b, then cylinder 5 is the location of the assembly error. If sensor 220c yields the greatest span value, then cylinder 4 is the location of the assembly error. Finally, if sensor 220d as the greatest span value, then cylinder 6 is the location of the assembly fault.

In a similar manner, if the routine of FIG. 5 determines that an outside cylinder is the location of an assembly error, then the routine will associate the sensor with the maximum value with a corresponding cylinder, as follows. If the sensor 220a has the maximum span, then cylinder 1 is the location of the assembly error. If sensor 220b has a maximum span value, then cylinder 7 is the location of the fault. If sensor 220c has the greatest span value, then cylinder 2 is the location of the assembly error. Finally, if censored 220d has the greatest span value, then the routine knows that cylinder 8 is the location of the assembly error.

The invention has been described with reference to an exemplary embodiment for the sake of example only. The scope and spirit of the invention is to be determined from a proper interpretation of the appended claims.

What is claimed is:

1. Apparatus for testing for proper assembly of an internal combustion engine having a plurality of cylinders with movable pistons therein, the apparatus comprising:

a plurality of vibration sensors positioned in a predetermined pattern upon an external surface of the engine, the sensors operative to generate electrical signals at sensor outputs related to vibrations sensed thereby;

a motive power source coupled to a crankshaft of the engine for causing rotation of the crankshaft at a predetermined rate; and a computing element coupled for receipt of the sensor outputs and operative to examine the sensor outputs while the motive power source is turning the crankshaft and to determine whether an assembly error has occurred by comparing functions of the sensor outputs to a preselected value.

2. The apparatus of claim 1 wherein the computing element is further operative to determine a cylinder location of an assembly error whenever an assembly error is determined.

3. The apparatus of claim 1 wherein the vibration sensors comprise accelerometers.

4. The apparatus of claim 2 wherein the vibration sensors comprise accelerometers.

5. The apparatus of claim 3 wherein the engine's block has a V-shaped cross-section and wherein the plurality of sensors comprises four accelerometers, with two accelerometers positioned at each end of the engine block at opposite ends of the crankshaft.

6. A method for testing for proper assembly of an internal combustion engine having a plurality of cylinders with movable pistons therein; the method comprising the steps of:

placing a plurality of vibration sensors at predetermined locations on an external surface of the engine;

causing rotation of a crankshaft of the engine at a predetermined rate; and using a computing element to monitor outputs of the plurality of sensors while the crankshaft is rotating and to determine whether an assembly error has occurred by comparing computed functions of the sensor outputs to a preselected value.

7. The method of claim 6 wherein the step of using a computing element further comprises determining the identification of an engine cylinder containing an improperly assembled part whenever an assembly error has been determined.

8. A method for testing for proper assembly of piston heads and connecting rod bearings in an internal combustion engine having a V-shaped engine block cross-section, the method comprising the steps of:

placing two vibration sensors at predetermined locations on each end of the engine block located at opposite ends of an engine crankshaft;

rotating the crankshaft at a predetermined rate;

collecting data from an output of each sensor representative of sensed vibration magnitudes generated over time as the crankshaft is rotating;

determining a span from the data for each sensor by subtracting a minimum datum value from a maximum datum value for each sensor;

determining which sensor has the greatest span value;

comparing the greatest span value to a predetermined threshold; and generating an indication of improper engine assembly when ever the greatest span value exceeds the predetermined threshold.

9. The method of claim 8 comprising the further steps of:

comparing the extent to which the greatest span value exceeds the threshold (excess) to a predetermined limit;

generating an indication that a connecting rod bearing is missing whenever the excess exceeds the predetermined limit; and generating an indication that a piston head has been installed backwards in its corresponding cylinder whenever the excess does not exceed the predetermined limit.

10. The method of claim 9 comprising the further steps of:

determining which sensor has the second greatest span value;

subtracting the second greatest span value from the greatest span value and comparing the subtraction result to a second predetermined limit;

generating an indication that the improper assembly is associated with a piston whose cylinder is located at an end of the engine block whenever the subtraction result exceeds the second predetermined limit; and generating an indication that the improper assembly is associated with a piston whose cylinder is located other than at either end of the engine block whenever the subtraction result does not exceed the second predetermined limit.

11. The method of claim 10 comprising the further step of:

determining which cylinder of the engine block contains improperly assembled parts by correlating the location and identity of the sensor having the maximum span value to the indication of whether or not the cylinder is located at an end of the engine block.

12. Apparatus for testing for proper assembly of a reciprocating assembly of an internal combustion engine having multiple moving parts, the apparatus comprising:

four vibration sensors positioned on an external surface of the internal combustion engine;

a motive power source coupled to the device for causing the movement of the reciprocating assembly; and a computing element coupled for receipt of the outputs of the four vibration sensors and operative to examine the sensor outputs while the motive power source is causing movement of the reciprocating assembly and to determine whether an assembly error has occurred by comparing a computed function of the output of the four vibration sensors to a preselected value.

13. A method for testing for proper assembly of a reciprocating assembly of an internal combustion engine, the method comprising the steps of:

placing four vibration sensors in contact with the internal combustion engine;

causing movement of the reciprocating assembly; and using a computing element to monitor the outputs of the four sensors while the reciprocating assembly is in motion and to determine whether an assembly error has occurred by comparing a computed function of the four sensors to a preselected value.

* * * * *